United States Patent
Hontz

(10) Patent No.: US 9,588,659 B2
(45) Date of Patent: *Mar. 7, 2017

(54) INFORMATION DISPLAY

(71) Applicant: Kazark, Inc., Old Saybrook, CT (US)

(72) Inventor: Drue A. Hontz, Old Saybrook, CT (US)

(73) Assignee: Kazark, Inc., New Haven, CT (US)

( * ) Notice: Subject to any disclaimer, the term of this patent is extended or adjusted under 35 U.S.C. 154(b) by 462 days.

This patent is subject to a terminal disclaimer.

(21) Appl. No.: 14/067,229

(22) Filed: Oct. 30, 2013

(65) Prior Publication Data

US 2014/0068521 A1 Mar. 6, 2014

Related U.S. Application Data

(63) Continuation of application No. 13/104,539, filed on May 10, 2011, now Pat. No. 8,601,399.

(Continued)

(51) Int. Cl.
*G06F 3/14* (2006.01)
*G06F 3/0484* (2013.01)
(Continued)

(52) U.S. Cl.
CPC ........ *G06F 3/04842* (2013.01); *G06F 3/0483* (2013.01); *G06F 17/30994* (2013.01)

(58) Field of Classification Search
CPC .................. H04N 1/00429; G06F 17/2247
See application file for complete search history.

(56) References Cited

U.S. PATENT DOCUMENTS 5,295,243 A 3/1994 Robertson
6,448,987 B1 9/2002 Easty
(Continued)

FOREIGN PATENT DOCUMENTS

CN 101290618 A 10/2008
CN 101604312 A 12/2009
(Continued)

OTHER PUBLICATIONS http://web.archive.org/web/20100221215603/http://www.amazon.co.jp/%F3%83%8, accessed on Feb. 19, 2015.
(Continued)

*Primary Examiner* — Omar Abdul-Ali
(74) *Attorney, Agent, or Firm* — Sean D. Detweiler, Esq.; Morse, Barnes-Brown & Pendleton, P.C.

(57) ABSTRACT

A system and method for a computer implemented display of information organizes a visual screen display to a user in such a way that the user is able to efficiently select information content, and then be presented with topical associations relating to that content. The display enables selection of a particular information segment having an association with particular information content. A selected information segment has multiple topical associations with various categories and sub-categories of information. A user may navigate to a particular segment of information content, and then be presented with a string of topically related segments, as well as with one or more connecting categories of information, which may otherwise not have been readily apparent to the particular selected segment, but for the display system and method. One or more of the information segment indicators can optionally include a publication date and/or a source identifier.

26 Claims, 10 Drawing Sheets

Related U.S. Application Data

(60) Provisional application No. 61/356,189, filed on Jun. 18, 2010, provisional application No. 61/408,969, filed on Nov. 1, 2010.

(51) Int. Cl.
*G06F 17/30* (2006.01)
*G06F 3/0483* (2013.01)

(56) References Cited

U.S. PATENT DOCUMENTS

| | | |
|---|---|---|
| 7,568,148 B1 | 7/2009 | Bharat et al. |
| 7,660,822 B1 | 2/2010 | Pfleger |
| 7,908,371 B2 | 3/2011 | Friedman et al. |
| 8,341,146 B1 | 12/2012 | Bleckner et al. |
| 8,601,399 B2 | 12/2013 | Hontz, Jr. |
| 8,880,499 B1 | 11/2014 | Wu |
| 9,251,519 B1 | 2/2016 | Bharat |
| 2003/0037050 A1 | 2/2003 | Monteverde |
| 2006/0161535 A1 | 7/2006 | Holbrook |
| 2007/0061303 A1 | 3/2007 | Ramer et al. |
| 2007/0179952 A1 | 8/2007 | Vespe et al. |
| 2007/0244900 A1 | 10/2007 | Hopkins et al. |
| 2008/0010119 A1 | 1/2008 | Oliveira et al. |
| 2008/0301112 A1 | 12/2008 | Wu |
| 2009/0171899 A1 | 7/2009 | Chittoor et al. |
| 2010/0197353 A1 | 8/2010 | Marui et al. |
| 2012/0005016 A1 | 1/2012 | Graff |
| 2013/0036169 A1 | 2/2013 | Quigley |
| 2015/0052482 A1 | 2/2015 | Hontz, Jr. |

FOREIGN PATENT DOCUMENTS

| | | |
|---|---|---|
| JP | 2009-245453 | 10/2009 |
| WO | WO 2011/159408 A1 | 12/2011 |
| WO | WO 2013/130739 | 9/2013 |

OTHER PUBLICATIONS http://web.archive.org/web/20100418194120/http://www.asahi/com/sports/baseball/n . . . , accessed on Feb. 19, 2015.
http://web.archive.org/web/20100413041623/http://www.asahi.com/entertainment, accessed on Feb. 19, 2015.
http://web.archive.org/web/20100413203328/http://www.asahi.com/sports/bb/mlb.html, accessed on Feb. 19, 2015.
International Search Report for International Application PCT/US2011/35924, dated Aug. 12, 2011.
Non-Final Office Action for U.S. Appl. No. 13/104,539, dated Sep. 17, 2012.
Notice of Allowance for U.S. Appl. 13/104,539, dated Oct. 15, 2013.
Munroe, "Reddit's New Comment Sorting System", URL http://blog.reddit.com/2009/10/reddits-new-comment-sorting-system.html, accessed on Apr. 16, 2013.
"Google's +1 button finally becomes useful for sharing content on the web", *The Independent*.
International Search Report for International Application No. PCT/US2013/028222, dated May 10, 2013.
Supplementary European Search Report for European Application No. EP 13755044, dated Feb. 18, 2016.
Non-Final Office Action for U.S. Appl. No. 14/382,525, dated Aug. 26, 2016.

INFORMATION DISPLAY

RELATED APPLICATIONS

This application is a continuation of co-pending U.S. application Ser. No. 13/104,539, filed May 10, 2011, which claims priority to and the benefit of U.S. Provisional Application No. 61/356,189, filed Jun. 18, 2010, and U.S. Provisional Application No. 61/408,969, filed Nov. 1, 2010, for all subject matter contained in said applications. The disclosures of said applications are hereby incorporated by reference in their entirety.

FIELD OF THE INVENTION

The present invention relates to a computer implemented display suitable for presenting information to a user, and more particularly to a visual display having an arrangement of selectable tabs or links having various topical associations with information content.

BACKGROUND OF THE INVENTION

Over time, increasing amounts of information have been stored on computers. With so much information being stored, there have been numerous solutions for providing users with the ability to search through the information and locate desired portions of the information. The field of computer science has provided data structures and database technology. The Internet is searchable using numerous different search engines, including Google™, Yahoo®, and others. Furthermore, news companies, such as CNN, MSNBC, Fox News, et al., place vast amounts of news stories online, using different search engine technologies to enable users to find particular stories and content. Likewise, online shopping companies, such as Amazon.com offer consumers the ability to search and locate items for purchase using various search engine capabilities. Most websites operated by companies, organizations, entities, or even individuals, provide countless methods for searching and displaying information to users.

However, with all of the above mechanisms for managing information, the eventual display of that information has shortcomings in its ability to correlate and present the information in a logical way that illustrates topical associations between the information content in a manner enabling users to efficiently navigate through the resulting information, leveraging those associations. The present invention addresses these shortcomings.

SUMMARY

There is a need for a computer implemented system and method for displaying information in a manner that leverages topical associations between different information content. The present invention is directed toward further solutions to address this need, in addition to having other desirable characteristics.

In accordance with embodiments of the present invention, a computer implemented display of information can include a selected category indicator representing a selected category of information content. A selected sub-category indicator representing a selected sub-category of information content can be included, and the sub-category can have a topical association with the selected category. At least one selectable sub-category indicator representing an alternate sub-category of information content having a topical association with the selected category can be included. A selected information segment indicator providing access to selected information content can be included, and the selected information segment indicator can have a topical association with the selected sub-category. A plurality of selectable information segment indicators can be included, and each selectable information segment indicator can provide access to additional information content and each selectable information segment indicator can have a topical association with the selected sub-category. At least one selectable connecting category indicator can be included, and each selectable connecting category indicator can represent a connecting category, sub-category, or an information segment of information content and each selectable connecting category can have a topical association with the selected information content.

In accordance with embodiments of the present invention, the plurality of selectable information segment indicators can be arranged in a string configuration. The plurality of selectable information segment indicators can be temporally arranged in a string configuration. The selected category indicator can be arranged within a hierarchy of additional category indicators. The selected sub-category indicator can be a terminal category indicator of a hierarchical structure of category indicators. The selected information segment indicator can include a hyperlink to information content, a pointer to information content, or an associative indication to information content. Selection of the selected information segment indicator can cause the display to further include information content.

In accordance with aspects of the present invention, selection of a different category indicator can cause the at least one selectable sub-category indicator to be replaced by a different at least one selectable sub-category indicator, can cause the plurality of selectable information segment indicators to be replaced by a different plurality of selectable information segment indicators, and can cause the at least one selectable connecting category to be replaced by a different at least one selectable connecting category indicator. Selection of one of the at least one selectable sub-category indicators representing an alternate sub-category of information content can cause the plurality of selectable information segment indicators to be replaced by a different plurality of selectable information segment indicators and can cause the at least one selectable connecting category indicator to be replaced by a different at least one selectable connecting category indicator. Selection of a different selectable information segment indicator can cause the at least one selectable connecting category to be replaced by a different at least one selectable connecting category indicator. Selection of a different selectable information segment indicator can cause the at least one selectable connecting category indicator to be replaced by a different at least one selectable connecting category indicator and can cause the category indicator and the at least one selectable sub-category indicator to remain the same. The selected information segment indicator or one of the plurality of selectable information segment indicators further can include one or more of: a publication date and a source identifier.)

In accordance with embodiments of the present invention, an interactive information display can include a string formed of a plurality of selectable information segment indicators providing navigation links to data destinations. A category indicator representing a selected category of information content can be included. One or more navigation links to one or more alternate strings can be included. One or more navigation links to one or more connecting categories can be included. Each of the string and the one or more alternate strings can be topically associated with the information content of the selected category. Information content of each of the one or more connecting categories can be topically associated with a selected navigation link on the string.

In accordance with embodiments of the present invention, one or more of the string and the one or more alternate strings can be configured to move across the screen, on the screen, on to the screen, off of the screen, or any combination thereof. The plurality of selectable information segment indicators can be temporally arranged. The category indicator can be arranged within a hierarchy of additional category indicators. A selected sub-category indicator representing a selected sub-category of information content can be included, and the sub-category can have a topical association with the selected category. One of the plurality of selectable information segment indicators can be selected.

In accordance with embodiments of the present invention, a method of displaying navigation links to destination information in a single display can include displaying a string formed of a plurality of links to destination information and arranged in a group, and one of the plurality of links can be in a state of being selected. An indication of information content category can be displayed. One or more links to alternate strings can be displayed. One or more links to connecting categories can be displayed. Information content in the destination information can be topically associated with the information content category. Information content in the alternate strings can be topically associated with the information content category. Information content in the connecting categories can be topically associated with the selected link to destination information.

In accordance with embodiments of the present invention, information content can be displayed that is linked to by the one of the plurality of links that is in the state of being selected. Selection of one of the one or more links to connecting categories can cause the one or more links to alternate strings to be replaced by one or more links to different alternate strings, can cause the plurality of links to destination information to be replaced by a plurality of links to different destination information, and can cause the one or more links to connecting categories to be replaced by one or more links to different connecting categories. Selection of one of the one or more links to alternate strings can cause the plurality links to destination information to be replaced by a plurality of links to different destination information and can cause the one or more links to connecting categories to be replaced by a one or more links to different connecting categories. Selection of a different link of the plurality of links to destination information can cause the one or more links to connecting categories to be replaced by a one or more links to different connecting categories. Selection of a different link of the plurality of links to destination information can cause the one or more links to connecting categories to be replaced by one or more links to different connecting categories and can cause the indication of information content category and the one or more links to alternate strings to remain the same. One or more of the string and the one or more alternate strings can be moved across the screen, on the screen, on to the screen, off of the screen, or any combination thereof.

In accordance with embodiments of the present invention, a plurality of navigation links to information can be displayed in a singularly viewable display. The plurality of navigation links can include a string comprising of a plurality of navigation links to information destinations containing information. One or more navigation links to alternate strings can be included. A category indicator can be included that identifies a category genus with which the information contained in the information destinations and the one or more alternate strings are topically associated. One or more selectable links to connecting categories can be included, and each connecting category can include an alternate category genus having a topical association with a selected navigation link to an information destination.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
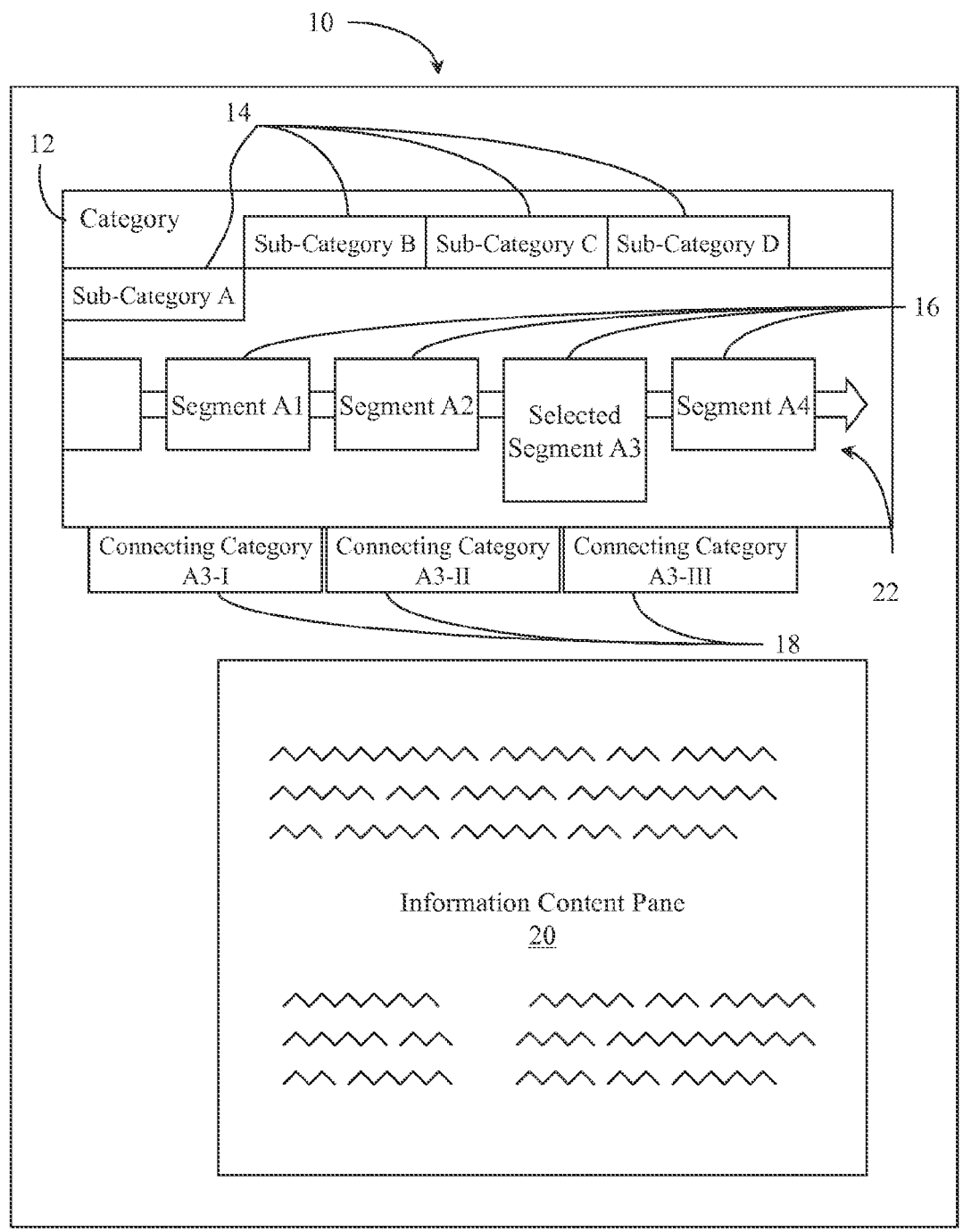
FIG. 1 is a diagrammatic screen shot illustration of a display according to one aspect of the present invention.

An illustrative embodiment of the present invention relates to a computer implemented display of information. The information is organized in a visual screen display to a user in such a way that the user is able to efficiently select information content, and then be presented with topical associations relating to that content. The display enables selection of a particular segment having an association with particular information content. The segment can be arranged in a string of segments. The string of segments can be configured to move across, move on, move onto, and/or move off of the display. A selected segment will have multiple topical associations with various categories and sub-categories of information. As presented, a user may navigate to a particular segment of information content, and then be presented with a string of topically related segments, as well as with one or more connecting categories of information, which may otherwise not have been apparent to the particular selected segment, but for the display of the present invention.

FIGS. 1 through 9, wherein like parts are designated by like reference numerals throughout, illustrate example embodiments of an information display according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

FIG. 1 illustrates a diagrammatic illustration of a computer implemented display 10 in accordance with the present invention. The display 10 can have numerous different layout configurations. The innovative nature of the present invention is not specifically limited by the particular location layout and placement of the components of the display 10 as illustrated herein. Rather, the present invention may be implemented in different screen layouts and configurations. However, for purposes of clarity and enablement, the present invention shall be illustrated and described with respect to the example display layout and configuration, including placement of each of the components as described, shown in the corresponding figures. One of skill in the art will appreciate that the present invention is not limited to the specific screen display layout detailed herein.

Turning now to the display 10 in accordance with the present invention, the display 10 is generally shown in FIG. 1 as an example or representative layout for a screen shot or screen display generated by a computer. The display 10 includes a category indicator 12. A plurality of sub-category indicators 14 is provided. A plurality of information segment indicators 16 is likewise provided. Furthermore, a plurality of connecting category indicators 18 is provided. While a plurality of each type of indicator is shown in the example embodiment, depending on the particular instance of the display 10, there may be as few as one or potentially none of certain indicators, as will be later described herein.

The present invention will be described first from the perspective of a particular selected information segment indicator of the plurality of information segment indicators 16 to illustrate much of the provided functionality. Each indicator of the plurality of information segment indicators 16 is selectable within the display 10. When selected, an information segment indicator such as selected segment A3, serves as a link or pointer or other associative indication to specific information content. The physical location of the information content can vary widely, depending on the type of information and the type of computer system or network upon which the display 10 of the present invention is operating. For purposes of illustration, the present invention may be described in the context of a display 10 that provides access to content information stored in a manner accessible via the Internet. As such, the specific physical location of the information content may be in any computer storage mechanism that is communicatively linked in some manner through the Internet to the computer implementing the display 10 of the present invention. What is meant by the term computer is described later herein, but for purposes of the present discussion should be considered to be compliant with the generally accepted definition of computer.

The selectable information segment indicators 16 can be arranged as a string, as described in greater detail herein. Furthermore, any string of the selectable information segment indicators 16 can be configured to move across the display, regardless of whether or not the moving string includes a selected information segment indicator 16. Embodiments of the present invention are not limited to the particular manner in which the motion occurs. In some embodiments, the motion occurs in the direction along which the string extends. In some embodiments, the string moves in a manner so as to cause some displayed selectable information segment indicators 16 to be removed from the display 10 (e.g., by "moving off of" display 10). In some embodiments, the string moves in a manner so as to cause displayed selectable information segment indicators 16 to appear on the display 10 (e.g., by "moving onto" the display 10). In some embodiments, the motion of the string on the display 10 is confined to two directions (e.g., up/down, left/right, or moving in two directions along any other axis or line), and the string is configured to move in the two directions. In other embodiments, the motion of the string on the display 10 is not confined to only two directions (e.g., can move up/down/left/right, can move forward or backward along a curved line, or can move in any other configuration involving motion in more than two directions). While motion of the segment information indicators 16 is described herein with specific reference to embodiments arranged in a string, any display according to embodiments of the present invention can implement such motion, regardless of the particular layout and organization of the information segment indicators 16.

Turning back to the particular selected information segment indicator, such as selected segment A3, this indicator serves as a link or pointer or other associative indication the specific information content, located somewhere for example on the Internet. Upon selection of the segment A3, the display provides the information content associated with that selected segment A3 in some form, including opening a new frame or screen containing the information content, or displaying the information content on some portion of the existing display, such as in an information content pane 20. The pane may be simply a visually generated area, or may be a separate window, frame, or the like. Another option includes the display navigating away and directly to the web page or other document containing the information content. The information in the information content pane 20 need not be provided by the same source that provides the information associated with the information segment indicators 16, the sub-category indicators 14, the category indicators 12, and the connecting category indicators 18. In fact, the content of the information content pane 20 can even be hosted (e.g., on a website) by a different source than the source that provides the information associated with the information segment indicators 16, the sub-category indicators 14, the category indicators 12, and the connecting category indicators 18. For example, an online website hosted by a third party company can include the illustrative display 10 as a section or portion of its own website display. In such instances, the display 10 can be installable as an "app" (e.g., an application), a plug-in, embedded content, or any other form of source information compatible with the host's website format, code, etc., as would be appreciated by one skilled in the art.

Take, for example, an instance of the display 10 of the present invention that shows results of a search for a news story. In such an instance, the selected segment A3 would have a depiction or textual indication of the particular news story, and having been selected, the news story information content is shown in the information content pane 20.

As noted earlier, the present invention is best understood by looking at a particular example of a specific selected segment and its corresponding information content. With the news story selected, the display 10 of the present invention will additionally include the category indicator 12, the plurality of sub-category indicators 14, the plurality of information segment indicators 16 (shown on in string 22 arrangement) and the plurality of connecting category indicators 18. The information content of the news story displayed in information content pane 20 has topical associations with all of the noted indicators 12, 14, 16, 18. More specifically, the information content of the news story of selected segment A3 has a topical association with the particular category indicator 12, each of the sub-category indicators 14, each of the segment indicators 16, and each of the connecting category indicators 18, displayed with the selected segment A3.

Taking the illustrative example one step further, for illustrative purposes assuming the information content display in the information content pane 20 is a news article discussing a baseball story about a particular baseball game and its outcome, the following describes how different example topically associative indicators 12, 14, 16, 18, may be presented in the display 10. Again, the particular topic of the information content can vary considerably, and is by no means restricted to the baseball example provided herein.

With the selected segment A3 pointing to the news article concerning the baseball game, such a news article may available for selection as falling under category indicator 12 to indication of "baseball". Each of the sub-category indicators may indicate specific baseball teams, for example, sub-category A can indicate "Red Sox", sub-category B can indicate "Yankees", sub-category C can indicate "Rays", and sub-category D can indicate "Blue Jays". Taking the example further, each of the plurality of information segment indicators 16 may read, for example as follows: segment A1 may indicate "Red Sox Spring Training article", segment A2 may indicate "Red Sox Injury Report", segment A3 may indicate "Red Sox vs. Yankees Game", and segment A4 may indicate "Red Sox Nation Event". Each of the plurality of information segment indicators 16 can be placed in a temporally organized manner, such as a chronological string 22, such that the date of publication of the information content indicated by a particular information segment indicator will dictate where on the string 22 the information segment indicator is placed relative to the other indicators in the plurality of information segment indicators 16. In such an arrangement, information content published earlier in time is reachable by navigating to the left along the string 22, while information content published more recently in time is reachable by navigating to the right along the string 22. One skilled in the art will appreciate that while chronological order may be a more comfortable and recognizable methodology for placement of information segment indicators along the string 22, other quantities and units of measure may likewise be utilized to order the plurality of information segments 16, including but not limited to time, temperature, speed, volume, weight, pressure, power, length, consumption, force, rates, energy, electric current, density, bits, area, angle, value, and other quantitative and qualitative units of measure. Likewise, the string 22 may include a segment arrangement of random order.

Continuing with the example, each of the plurality of connecting category indicators 18 may then indicate information content associated with the Red Sox vs. Yankees baseball game, for example, connecting category A3-I may indicate "The Jimmy Fund Charity", connecting category A3-II may indicate "Fenway Park", and connecting category A3-III may indicate "John Henry, owner of the Red Sox". One of skill in the art will appreciate that there are virtually an infinite amount of indicators 12, 14, 16, 18 that may result in a particular display 10 based on the information content in a selected segment indicator of the plurality of segment indicators 16, such that the present invention is not limited to the example described herein.

It should be noted here, that the chosen or selected category indicator 12 dictates which of the plurality of sub-category indicators 14 is presented. Likewise, the chosen or selected sub-category indicator of the plurality of sub-category indicators 14 dictates which of the plurality of information segment indicators 16 is presented. Likewise, the chosen or selected information segment of the plurality of information segment indicators 16 dictates which of the plurality of connecting category indicators 18 is presented, as well as what information content is displayed in the information content pane 20, or the location of a navigation execution instruction to information content. As will be elaborated upon later herein, each of the plurality of connecting category indicators 18 can provide a link or pointer or other associative indication directly to a different category indicator, a different sub-category indicator, or a different information segment indicator. Said differently, each of the plurality of connecting category indicators 18 can point or link to a category of some time, or to the information content directly (as in an information segment indicator).

Figure 2:
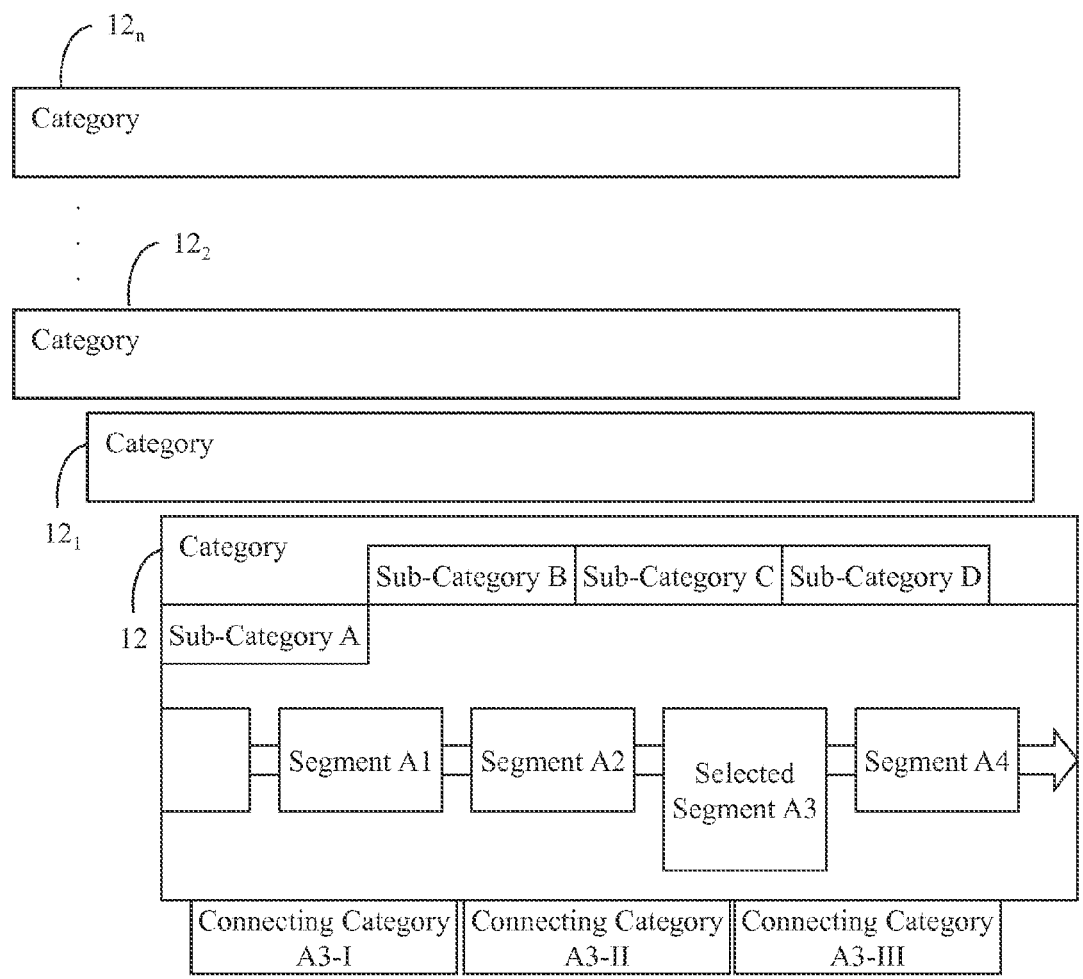
FIG. 2 is a diagrammatic illustration of the display, according to one aspect of the present invention.

FIG. 2 is a diagrammatic illustration of the display 10 in accordance with aspects of the present invention. The category indicator 12 can be part of a hierarchical structure of category indicators. More specifically, and as shown in the figure, category indicator 12 may actually be a sub-category of category indicator $12_1$. Likewise, category indicator $12_1$ may actually be sub-category of category indicator $12_2$. This hierarchical structure may be continued out to category indicator $12_n$, as would be understood by one of skill in the art, such that the present invention is by no means limited to a category indicator structure having only one level of category indicator and one level of sub-category indicator. Rather, any category indicator 12 may be part of a larger hierarchical structure of category indicators, as would be dictated by the information content and topical associations with which the category indicators 12 have an affiliation. Furthermore, each sub-category indicator may represent the terminal category indicator of any hierarchical structure having multiple category indicators.

Figure 3A:
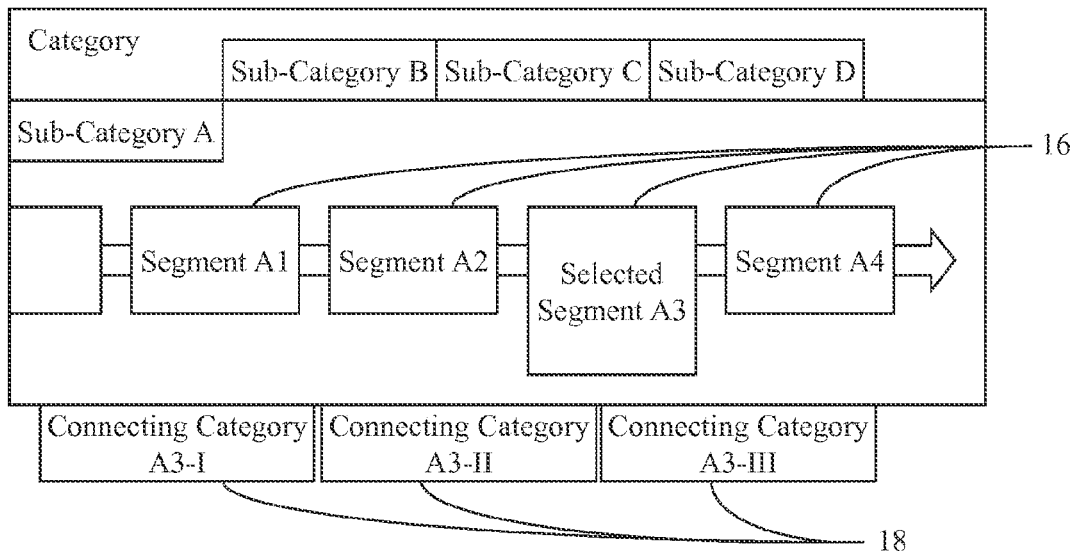
FIG. 3A is a portion of the diagrammatic screen shot illustration of the display of FIG. 1 with a selected information segment indicator, according to one aspect of the present invention.
Figure 3B:
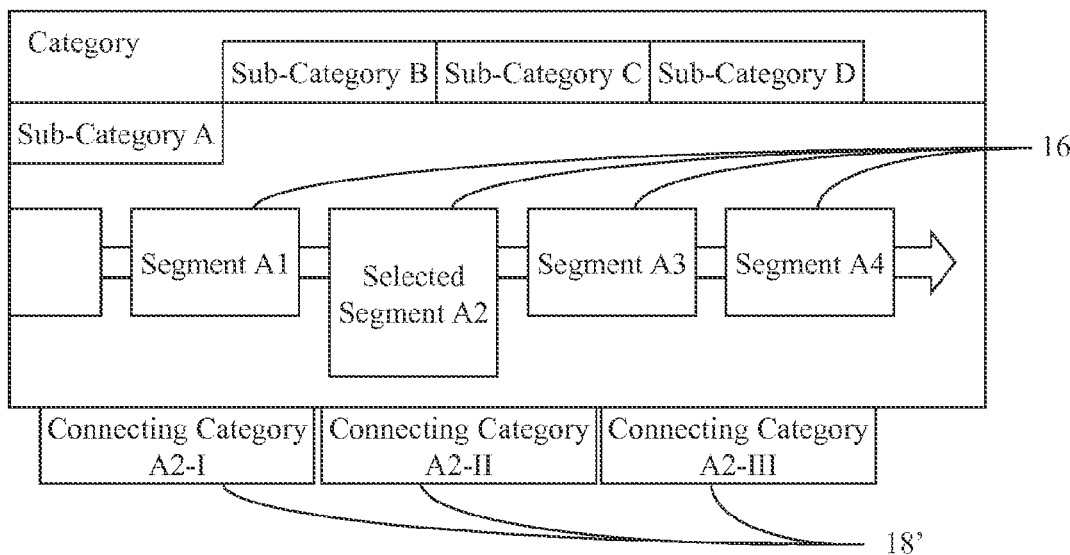
FIG. 3B is a diagrammatic screen shot illustration of the display of FIG. 3A, with a different information segment indicator selected, according to one aspect of the present invention.

FIGS. 3A and 3B are diagrammatic illustrations demonstrating a change in segment indicator of the plurality of information segment indicators 16 at a particular instance. FIG. 3A shows the display 10 of FIG. 1, with information segment indicator A3 selected. The selection of information segment indicator A3 falls within a category indicator 12 and the plurality of sub-category indicators 14 (Sub-Category A, Sub-Category B, Sub-Category C, and Sub-Category D). With information segment indicator A3 selected, the plurality of connecting category indicators (Connecting Category A3-I, Connecting Category A3-II, and Connecting Category A3-III) are presented within the display 10.

FIG. 3B is a diagrammatic illustration demonstrating how the display 10 changes with the selection of a different information segment indicator. In FIG. 3B, information segment indicator A2 is now selected (rather than information segment indicator A3). With this change in selection, one can appreciate that there is no change in the category indicator 12, or any of the plurality of sub-category indicators 14 (Sub-Category A, Sub-Category B, Sub-Category C, and Sub-Category D). All of said indicators remain the same. What does change with the selection of a different information segment indicator are the particular connecting category indicators from the plurality of connecting category indicators 18 to a plurality of connecting category indicators 18'. As is further demonstrated, the plurality of connecting category indicators 18' now includes Connecting Category A2-I, Connecting Category A2-II, and Connecting Category A2-III, instead of Connecting Category A3-I, Connecting Category A3-II, and Connecting Category A3-III.

Following the previously presented illustrative example of the baseball news article, the above-described change in information segment indicator can be further illustrated as follows. In the illustrative example, segment A2 indicated "Red Sox Injury Report", while segment A3 indicated "Red Sox vs. Yankees Game". When segment A3 was selected, connecting category A3-I indicated "The Jimmy Fund Charity", connecting category A3-II indicated "Fenway Park", and connecting category A3-III indicated "John Henry, owner of the Red Sox". As shown in FIG. 3B, with segment A2 selected, the new connecting category may include information content such as connecting category A2-I "Mike Lowell Thumb Injury", connecting category A2-II "Rehab Stint In Pawtucket", and connecting category A2-III "Tommy John Surgery".

Figure 4A:
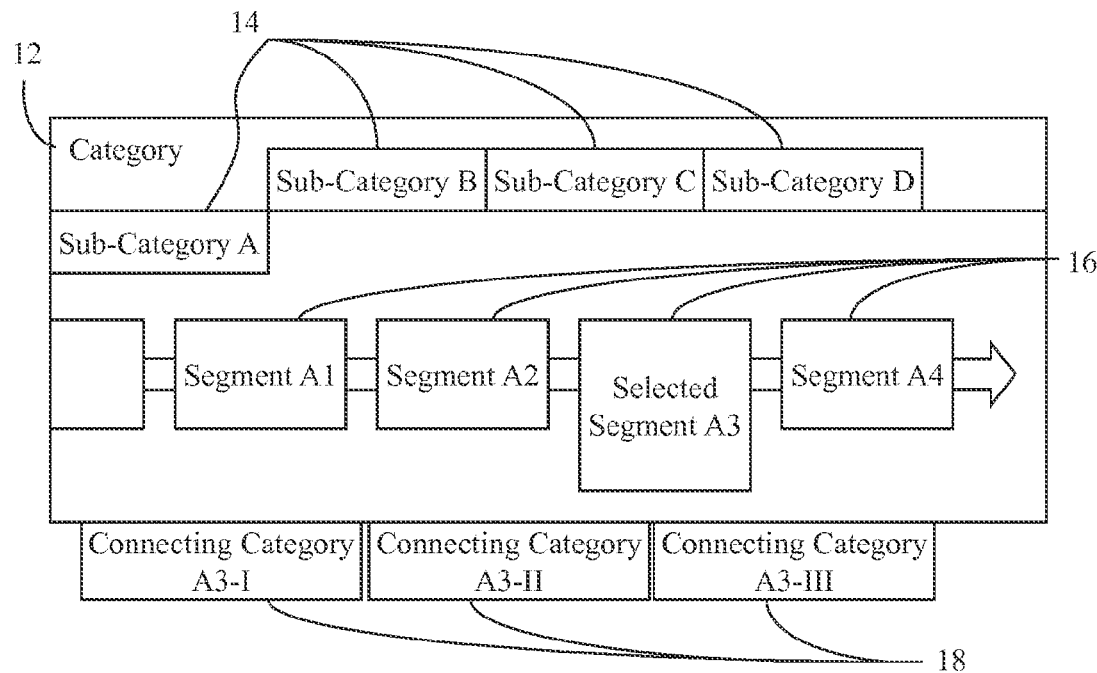
FIG. 4A is a portion of the diagrammatic screen shot illustration of the display of FIG. 1 with a selected Sub-Category indicator, according to one aspect of the present invention.
Figure 4B:
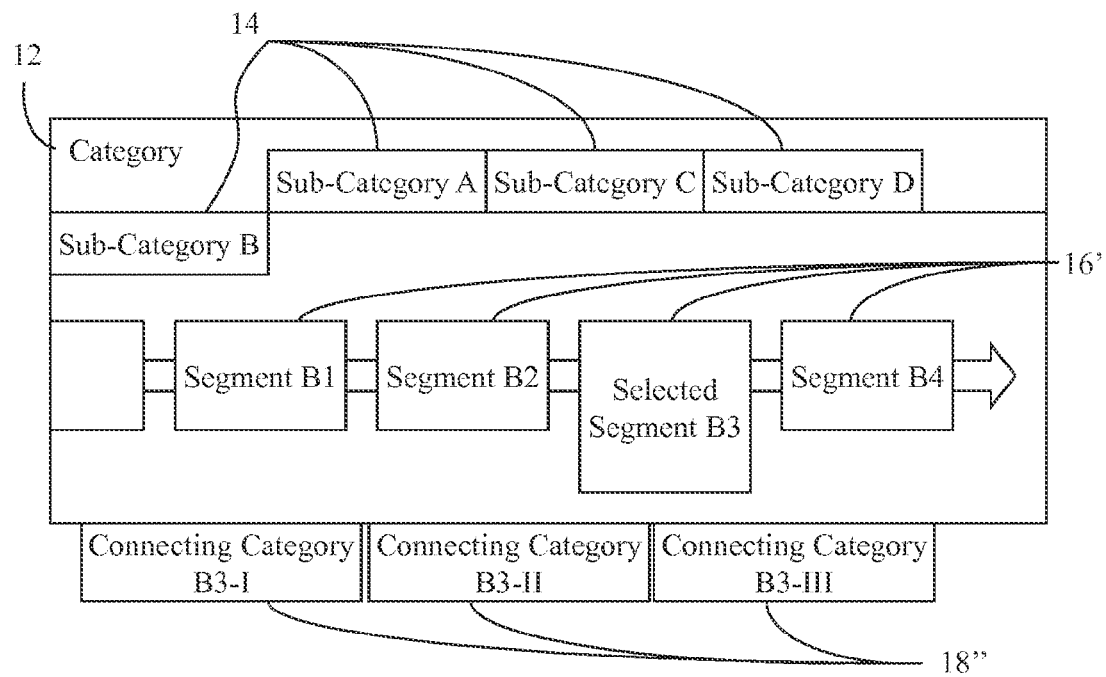
FIG. 4B is a diagrammatic screen shot illustration of the display of FIG. 4A, with a different Sub-Category indicator selected, according to one aspect of the present invention.
Figure 5:
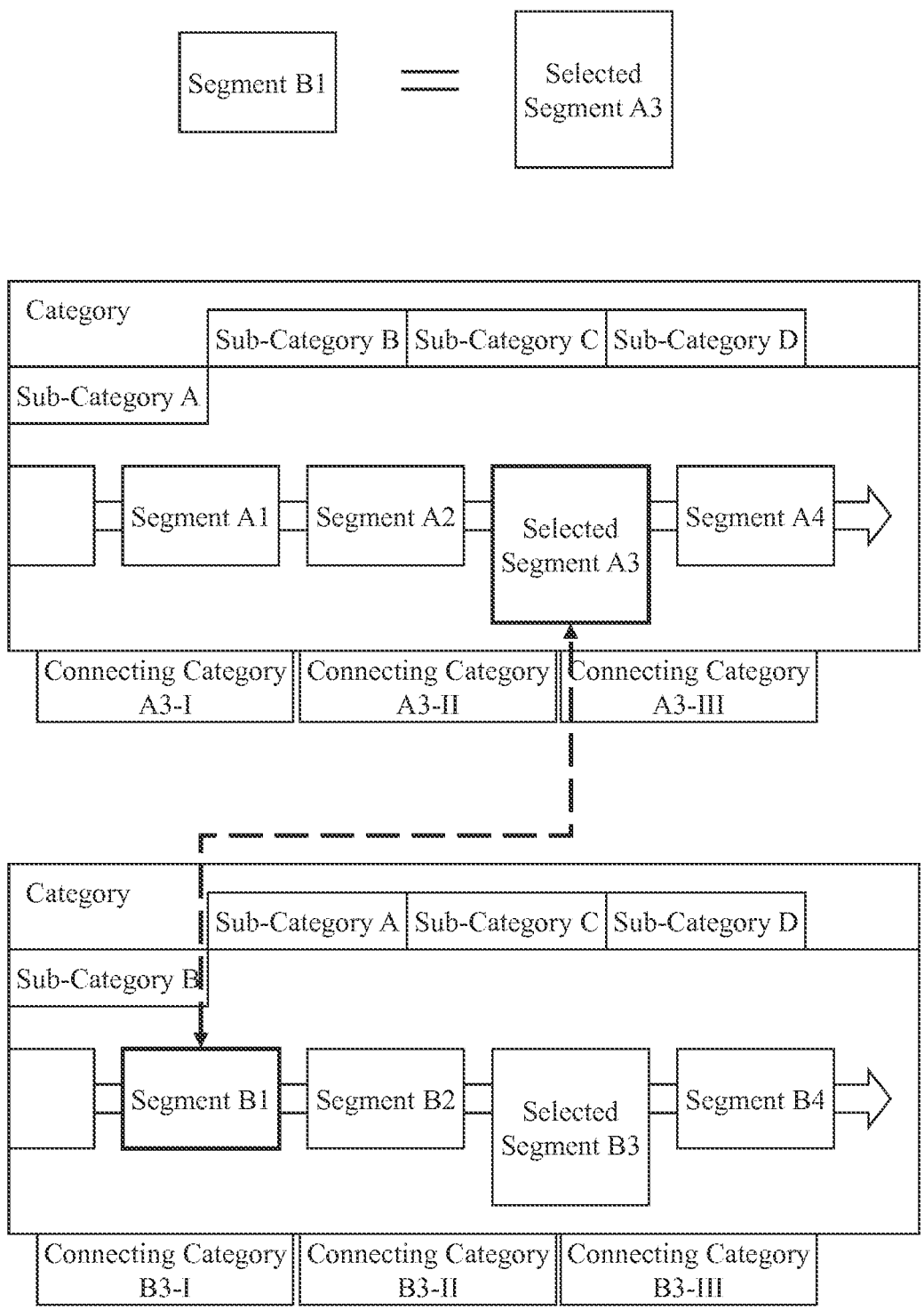
FIG. 5 is a diagrammatic illustration demonstrating two different segment indicators being associated with the same information content, according to one aspect of the present invention.

FIGS. 4A and 4B are diagrammatic illustrations demonstrating a change in sub-category indicator of the plurality of sub-category indicators 14 at a particular instance. FIG. 4A shows the display 10 of FIG. 1, with Sub-Category A selected. All of the plurality of sub-category indicators 14, the plurality of information segment indicators 16, and the plurality of connecting category indicators 18 would be as previously described herein for the illustrative baseball example.

FIG. 4B is a diagrammatic illustration demonstrating how the display 10 changes with the selection of a different sub-category indicator. In FIG. 4B, Sub-Category B indicator "Yankees" is now selected (rather than Sub-Category A indicator "Red Sox"). With this change in selection, one can appreciate that there is no change in the category indicator 12. However, the particular indicators in a plurality of information segment indicators 16' and in a plurality of connecting category indicators 18" now differs from those displayed in FIG. 1. More specifically, the plurality of information segment indicators 16' may include information content such as information segment indicator B1 "Red Sox vs. Yankees Game", information segment indicator B2 "Fall Preview", information segment indicator B3 "Yankees Prospect Report", and information segment indicator B4 "Yankees, Then & Now".

With information segment B3 selected ("Yankees Prospect Report"), the plurality of connecting category indicators 18" may include the following: Connecting Category B3-I "Yankee Farm System", Connecting Category B3-II "George Steinbrenner, Yankee Owner", and Connecting Category B3-III "Top Historical Prospects".

Again, as would be understood by those of skill in the art, the particular information content topics provided herein are provided merely as illustrative examples under the representative "baseball" themed category 12. The present invention is by no means limited to the information content of the illustrative examples described herein. The illustrative examples merely demonstrate some of the interrelationships of the information content and topical associations that may be leveraged by the display 10 of the present invention.

In the illustrative "baseball" example, one may note that the titles of selected information segment indicator A3 from FIG. 1, and information segment indicator B1 from FIG. 4B are the same, namely, "Red Sox vs. Yankees Game". As further illustrated in FIG. 5, both information segment indicators A3, B1, link or point or otherwise are associative indications of the identical information content locations. In other words, the identical news article (in this example instance) with the title "Red Sox vs. Yankees Game" can be navigated to using the display 10 of the present invention either by navigating to the category indicator 12 "Baseball", the sub-category indicator A "Red Sox", and the information segment indicator A3 "Red Sox vs. Yankees Game", or alternatively by navigating to the category indicator 12 "Baseball", the sub-category indicator B "Yankees", and the information segment indicator B1 "Red Sox vs. Yankees Game". Furthermore, the same information content topic and location may be able to be navigated to using other combinations of category indicator, sub-category indicator, and information segment indicator, depending on the particular information content topic, and the available category, sub-category, and segment breakdowns.

Figure 6:
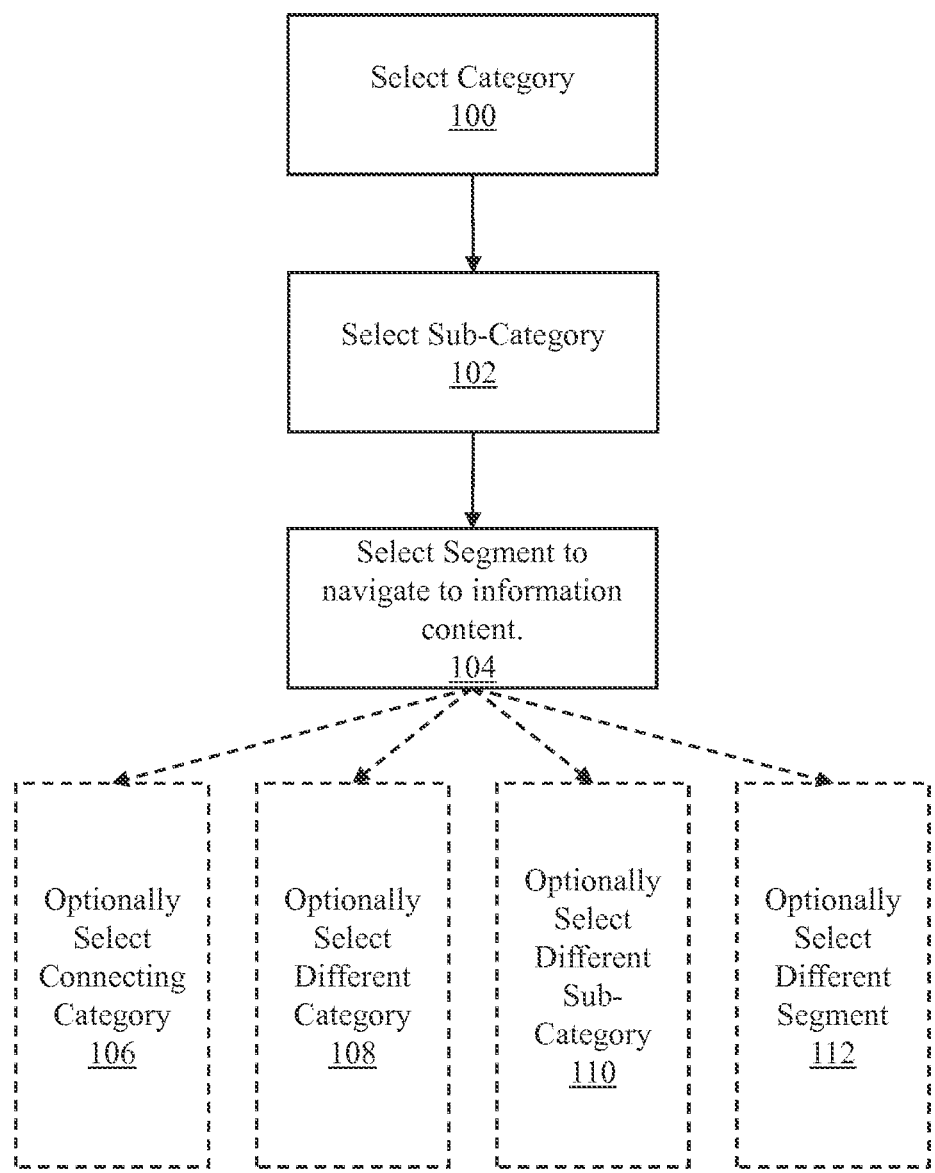
FIG. 6 is a diagrammatic flow chart illustrating an example process for navigating using the display, according to aspects of the present invention.

FIG. 6 is a flowchart depicting an example method of using the display 10 to navigate to particular information content. In accordance with one example embodiment of the present invention, a category indicator 12 is selected (step 100). As noted in the above discussion, the category indicator 12 may result from a hierarchical structure of category indicators, depending on the particular implementation. A sub-category indicator is then selected from a plurality of sub-category indicators 14 (step 102). The selection of the sub-category indicator will result in the display of a string 22 of a plurality of information segment indicators 16, of which a segment can be selected to cause the navigation to the desired information content (step 104). At least upon execution of step 104, if not before, information content will be displayed in some form (e.g., by link, by information content pane 20, by opening of a new frame or window, and the like). The display of information content can be prompted by an automated process whenever the display 10 is presented, or can include recommendations provided by a logic sequence of the display 10, or can result from implementation of the process of active selection as described above. If desired, any number of optional steps may be executed to further navigate to other information content, including optionally selecting a connecting category indicator (step 106), optionally selecting a different category indicator (step 108), optionally selecting a different sub-category indicator (step 110), or optionally selecting a different information segment indicator (step 112). With each selection, additional options of category indicator, sub-category indicator, connecting category indicator, and information segment indicator will become available.

As one of skill in the art may appreciate given the present disclosure, the display 10 of the present invention provides a new and novel way to display information content and to provide access and indications of information content, and the way the information content is topically associated with other information content, that goes well beyond a conventional search engine. For example, returning to FIG. 1, if a user is presented with the display 10 of FIG. 1, they have at their fingertips a series of selectable information content arranged on the string 22. Each segment of information content, would require a separate entry of search terms into a search box of a conventional search engine, and then a review of the results to obtain links to the information content arranged on the string 22 (in this example in chronological order). In addition, each sub-category indicator that is readily accessible from the display 10 would also require a separate entry of search terms into a search box of a conventional search engine, and then a review of the results to obtain links to the information content. In addition, each connecting category indicator that is readily accessible from the display 10 would also require a separate entry of search terms into a search box of a conventional search engine, and then a review of the results to obtain links to the information content. All of the above separate searches and relevant results are all presented in the navigable display 10 of the present invention.

The structure of the display 10, and the specific selection of category indicator 12 topics, plurality of sub-category indicator 14 topics, plurality of information segment indicator 16 topics, and plurality of connecting category indicator 18 topics can be configured and arranged prior to presentation of the display 10 to a user. The configuration and arrangement can be done manually by one or more individuals reviewing the content information and placing the information segment indicators linking to the content information within the structure of the display. Alternatively, the configuration and arrangement can be done in an automated manner using virtual robots, virtual spiders, or other logical processes or algorithms to comb the Internet and other sources of information to locate the information content, identify topics of the information content, and place information segment indicators linking to the information content within the structure of the display 10, including further building the associative links between the categories, sub-categories, segments, and connecting categories.

As should be further understood by one of skill in the art, the display 10 of the present invention can be continually updated and expanded to add content information, category indicators 12, sub-category indicators 14, information segment indicators 16, and connecting category indicators 18. The display 10 can be updated to arrange the string 22 numerous different ways as well, and the string 22 can be expanded in different directions, adding information segment indicators where logically appropriate.

As previously mentioned, the display 10 of the present invention can operate with numerous different types of information content. The capabilities of the display 10 of the present invention are vast with regard to linking together information in a new and novel manner in such a way that interrelationships between information content and associated topics can be easily discovered and leveraged by a user of the display 10. For example, a single news article can appear in numerous different strings 22. Accordingly, the same news article information content can result in differing navigational processes through the selection of different category indicators 12 and sub-category indicators 14.

Figure 7:
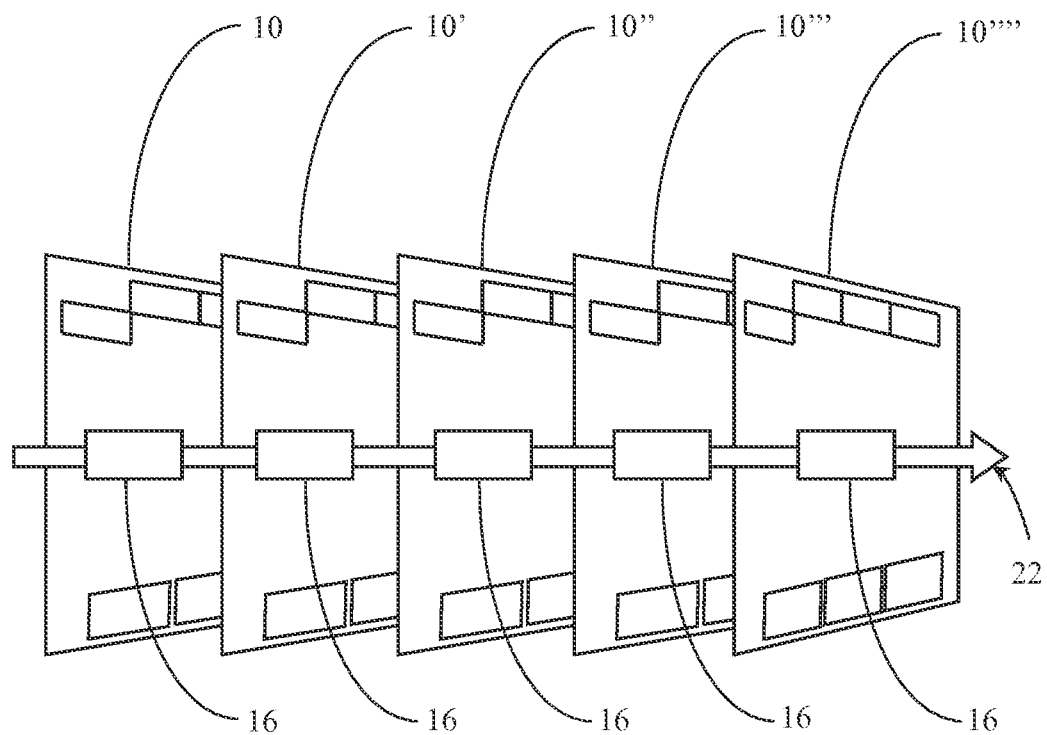
FIG. 7 is a diagrammatic illustration further demonstrating the existence of the plurality of information segment indicators in a string of a first display on different instances of displays as different category indicators and sub-category indicators are selected, in accordance with one example embodiment of the present invention.

FIG. 7 is a diagrammatic illustration further demonstrating the existence of the plurality of information segment indicators 16 in a string 22 of a first display 10, on different instances of displays 10', 10'', 10''', 10'''' as different category indicators and sub-category indicators are selected.

As described previously, in some embodiments, the plurality of information segment indicators 16 are placed in a temporally organized manner, such as a chronological string 22. The date of publication of the information content or the date the information content was made available, which is referred to herein and in the appended claims as the "publication date," can be indicated on a particular information segment indicator, as shown by publication date 24 in FIGS. 8A and 8B. The date of publication will dictate where on the string 22 each information segment indicator is placed relative to the other indicators. In such an arrangement, information content published earlier in time is reachable by navigating to the left along the string 22, while information content published more recently in time is reachable by navigating to the right along the string 22.

Figure 8A:
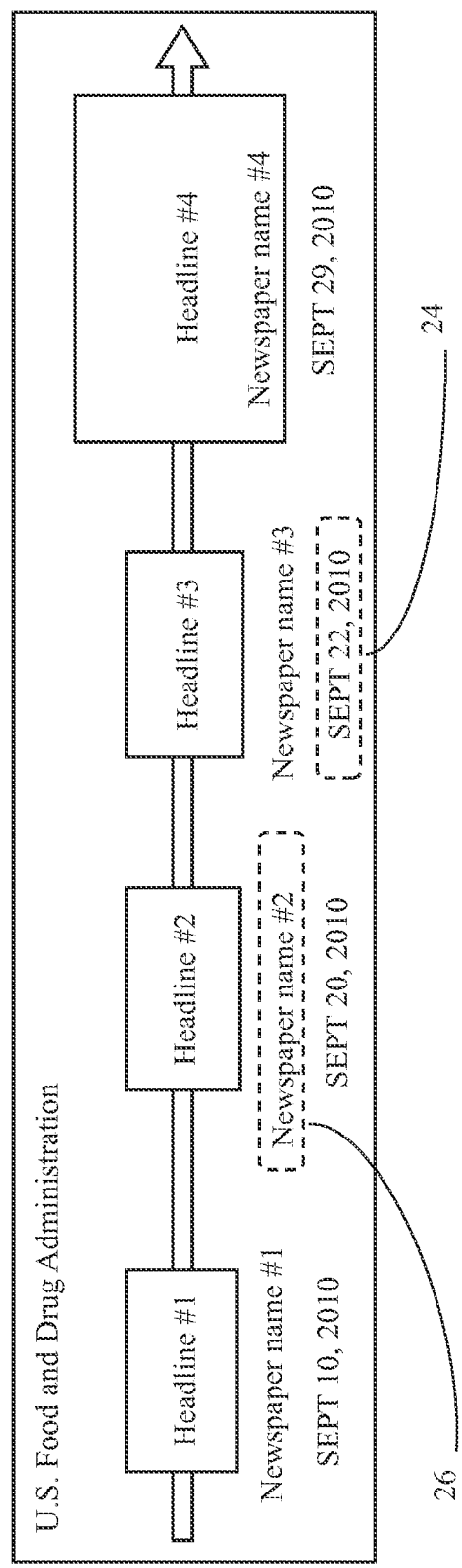
FIGS. 8A and 8B are diagrammatic illustrations demonstrating publication dates and source identifiers for the plurality of information segment indicators in accordance with aspects of the present invention.
Figure 8B:
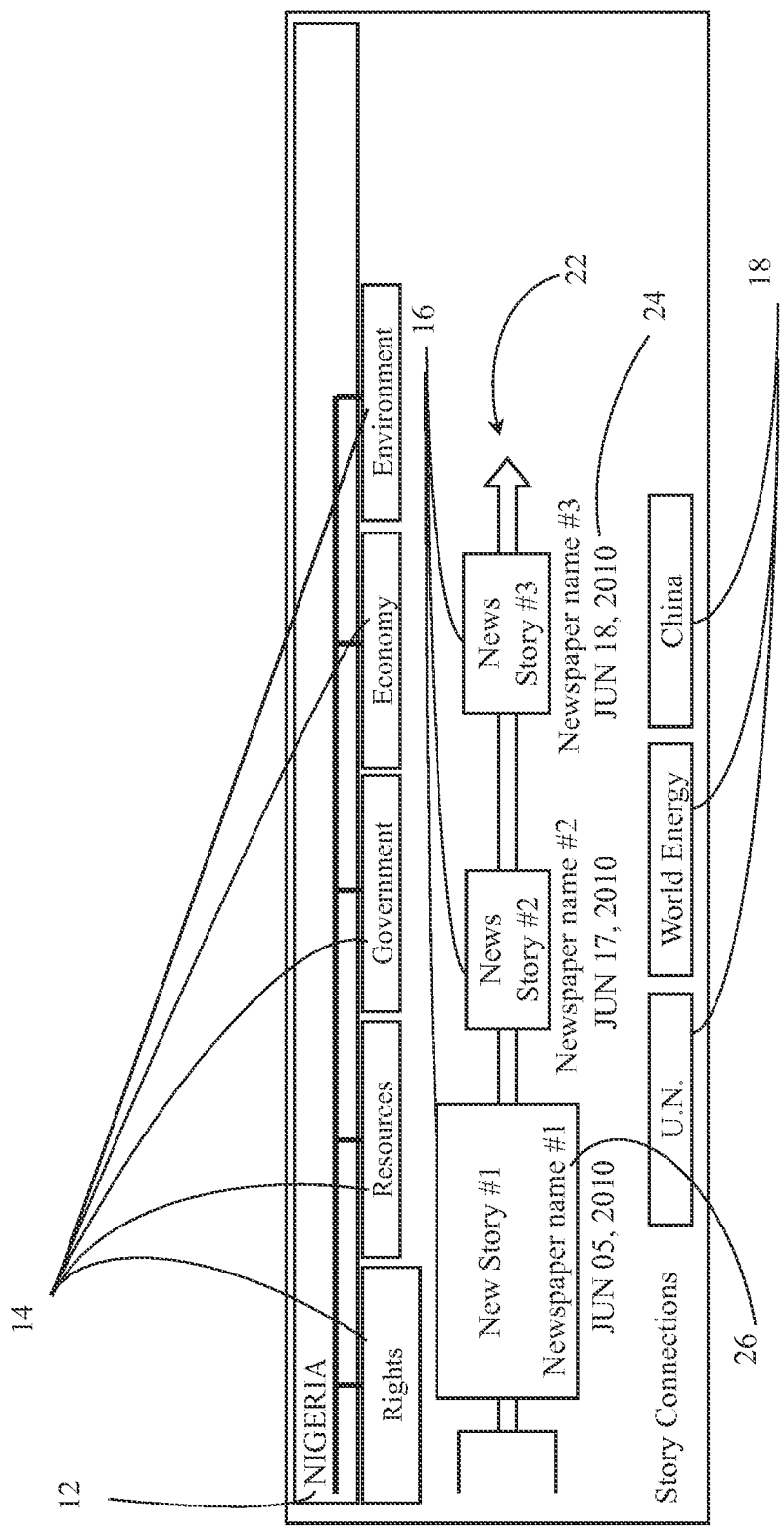

The publication date can be presented as a discrete time, a discrete date, a particular week, and the like. Any recognized unit of time or method for marking elapsed time can be used. For example, in the case of some sports, the publication date can be a particular week of a sports season. Furthermore, one of skill in the art will appreciate that a publication date need not be located directly on an information segment indicator as shown in FIGS. 8A and 8B. Other implementations are possible, such as a timeline associated with the string 22, or a display feature that allows users to access or view the publication date upon scrolling over or clicking on a particular information segment indicator. These and any other appropriate mechanisms for informing the user of a particular publication date can be used.

Additionally, as shown in FIGS. 8A and 8B, further embodiments of the present invention can also include a source identifier 26. A "source identifier," as referred to herein and in the appended claims, is a text string, associative logo, a color scheme, or other suitable type of indicator on a display that designates to a user some facet of the identity of the source that published the information content of a particular information segment indicator. For example, if the source is a news organization, the name of the organization can be presented by the source identifier 26. This example is shown in FIGS. 8A and 8B. Alternatively, the source identifier can signify to the user other aspects of the identity of the source, such as type of organization, location of an organization, political or other affiliations of an organization, organization's website URL, etc. In some embodiments pertaining to news stories, the name of the reporter or author of the information content can be shown by the source identifier. Additionally, multiple source identifiers can be utilized for any single information segment indicator. For example, a particular information segment indicator pertaining to a news article can include the name of the news source that published the article, and additionally can be given a particular color that indicates whether the news source is a website, blogger, openly supports a particular political party, etc.

While FIGS. 8A and 8B show illustrative embodiments that display both publication dates and source identifiers for each of the plurality of information segment indicators, other embodiments can be implemented that provide only one or none of these features. Similarly, when these features are included in the display 10, they need not be included for every one of the plurality of information segment indicators 16.

Figure 9:
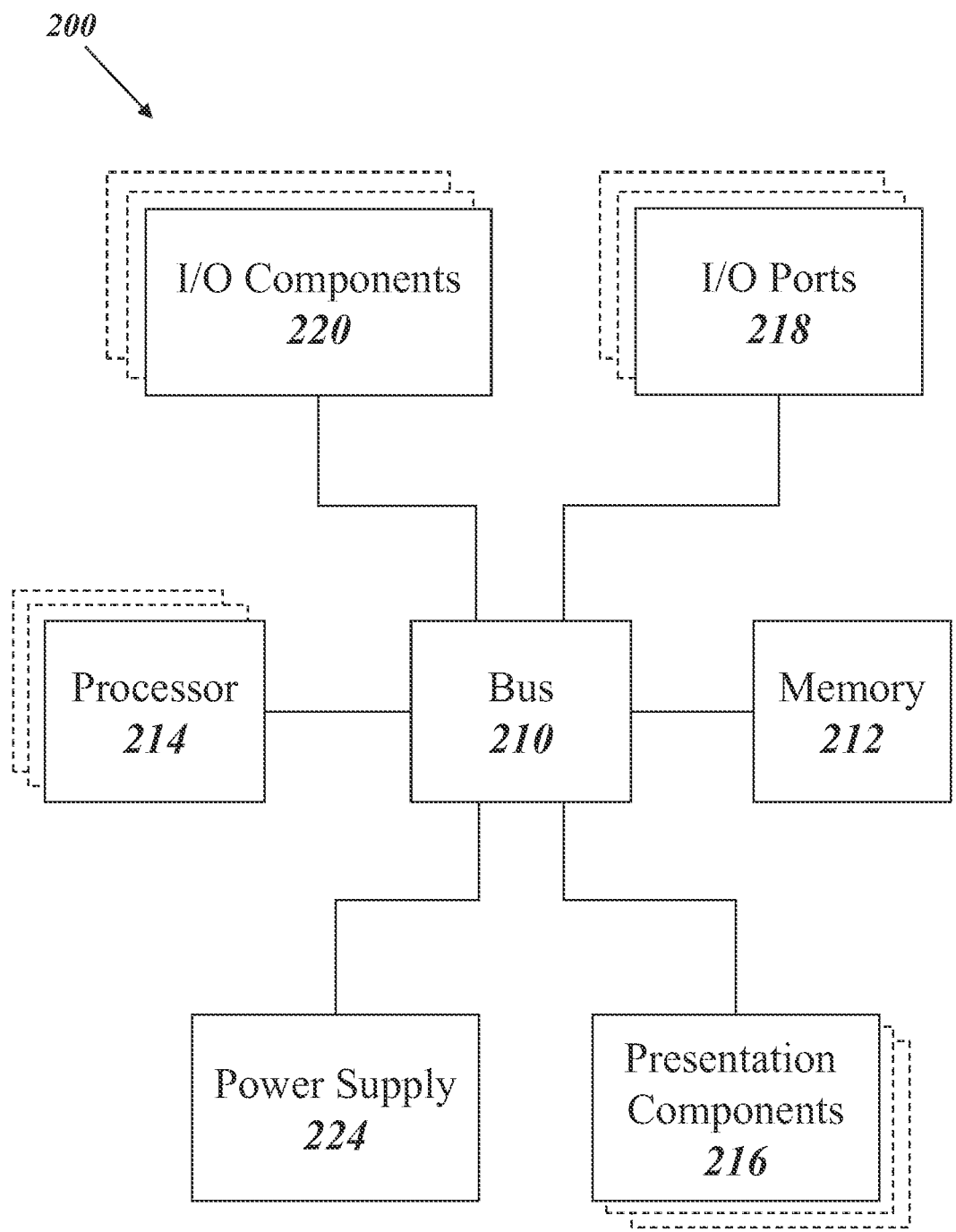
FIG. 9 is a block diagram depicting an example computing environment for implementing embodiments of the present invention.

FIG. 9 illustrates an example computing device 200 within an illustrative operating environment for implementing illustrative methods and systems of the present invention. The computing device 200 is merely an illustrative example of a suitable computing environment and in no way limits the scope of the present invention. A "computing device," as represented by FIG. 9, can include a "workstation," a "server," a "laptop," a "desktop," a "hand-held device," a "mobile device," a "tablet computer," a "computer," or other computing devices, as would be understood by those of skill in the art. Given that the computing device 200 is depicted for illustrative purposes, embodiments of the present invention may utilize any number of computing devices 200 in any number of different ways in order to implement a single embodiment of the present invention. Accordingly, embodiments of the present invention are not limited to a single computing device 200, as would be appreciated by one with skill in the art, nor are they limited to a single type of implementation or configuration of the example computing device 200.

The computing device 200 can include a bus 210 that can be coupled to one or more of the following illustrative components, directly or indirectly: a memory 212, one or more processors 214, one or more presentation components 216, input/output ports 218, input/output components 220, and a power supply 224. One of skill in the art will appreciate that the bus 210 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 9 is merely illustrative of an exemplary computing device that can be used to implement one or more embodiments of the present invention, and in no way limits the invention.

The computing device 200 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 200.

The memory 212 can include computer-storage media in the form of volatile and/or nonvolatile memory. The memory 212 may be removable, non-removable, or any combination thereof. Exemplary hardware devices are devices such as hard drives, solid-state memory, optical-disc drives, and the like. The computing device 200 can include one or more processors that read data from components such as the memory 212, the various I/O components 216, etc. Presentation component(s) 216 present data indications to a user or other device. Exemplary presentation components include a display device, speaker, printing component, vibrating component, etc.

The I/O ports 218 can allow the computing device 200 to be logically coupled to other devices, such as I/O components 220. Some of the I/O components 220 can be built into the computing device 200. Examples of such I/O components 220 include a microphone, joystick, recording device, game pad, satellite dish, scanner, printer, wireless device, networking device, and the like.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented display of information, comprising:
    a selected category indicator representing a selected category of information content;
    a selected sub-category indicator representing a selected sub-category of information content, the sub-category having a topical association with the selected category;
    at least one selectable sub-category indicator representing an alternate sub-category of information content having a topical association with the selected category;
    a selected information segment indicator providing access to selected information content, the selected information segment indicator having a topical association with the selected sub-category;
    a plurality of selectable information segment indicators, each selectable information segment indicator providing access to additional information content and each selectable information segment indicator having a topical association with the selected sub-category; and
    at least one selectable connecting category indicator, the selectable connecting category indicator representing a connecting category of information content that is different from the selected category of information content and that has a topical association with the selected information content;
    wherein selection of the selectable connecting category indicator causes display of a selected category indicator representing the connecting category of information content; and
    wherein each information segment indicator of the plurality of information segment indicators is arranged within the display of information in a particular layout and organization order based on specific information content associated with each of the information segment indicators.

2. The display of claim 1, wherein the plurality of selectable information segment indicators are arranged in a string configuration.

3. The display of claim 1, wherein the plurality of selectable information segment indicators are temporally arranged in a string configuration.

4. The display of claim 1, wherein the selected category indicator is arranged within a hierarchy of additional category indicators.

5. The display of claim 1, wherein the selected sub-category indicator is a terminal category indicator of a hierarchical structure of category indicators.

6. The display of claim 1, wherein the selected information segment indicator comprises a hyperlink to information content, a pointer to information content, or an associative indication to information content.

7. The display of claim 1, wherein selection of the selected information segment indicator causes the display to further comprise information content.

8. The display of claim 1, wherein selection of a different category indicator causes the at least one selectable sub-category indicator to be replaced by a different at least one selectable sub-category indicator, causes the plurality of selectable information segment indicators to be replaced by a different plurality of selectable information segment indicators, and causes the at least one selectable connecting category to be replaced by a different at least one selectable connecting category indicator.

9. The display of claim 1, wherein selection of one of the at least one selectable sub-category indicators representing an alternate sub-category of information content causes the plurality of selectable information segment indicators to be replaced by a different plurality of selectable information segment indicators and causes the at least one selectable connecting category indicator to be replaced by a different at least one selectable connecting category indicator.

10. The display of claim 1, wherein selection of a different selectable information segment indicator causes the at least one selectable connecting category to be replaced by a different at least one selectable connecting category indicator.

11. The display of claim 1, wherein selection of a different selectable information segment indicator causes the at least one selectable connecting category indicator to be replaced by a different at least one selectable connecting category indicator and causes the category indicator and the at least one selectable sub-category indicator to remain the same.

12. The display of claim 1, wherein the selected information segment indicator or one of the plurality of selectable information segment indicators further comprise one or more of: a publication date and a source identifier.

13. An interactive computer implemented information display, comprising:
   a plurality of selectable information segment indicators providing navigation links to data destinations;
   a category indicator representing a selected category of information content;
one or more navigation links to one or more alternate plurality of selectable information segment indicators; and
one or more navigation links to one or more connecting categories;
   wherein each of the plurality of selectable information segment indicators and the one or more alternate plurality of selectable information segment indicators is topically associated with the information content of the selected category;
   wherein information content of each of the one or more connecting categories is topically associated with a selected navigation link on the plurality of selectable information segment indicators;
   wherein selection of any one of the one or more navigation links to one or more connecting categories causes display of a category indicator representing the connecting category of the one or more connecting categories that corresponds to the selected any one of the one or more navigation links; and
   wherein each information segment indicator of the plurality of information segment indicators is arranged within the display of information in a particular layout and organization order based on specific information content associated with each of the information segment indicators.

14. The interactive information display of claim 13, wherein one or more of the plurality of selectable information segment indicators and the one or more alternate plurality of selectable information segment indicators are configured to move across the screen, on the screen, on to the screen, off of the screen, or any combination thereof.

15. The interactive information display of claim 13, wherein the plurality of selectable information segment indicators are temporally arranged.

16. The interactive information display of claim 13, wherein the category indicator is arranged within a hierarchy of additional category indicators.

17. The interactive information display of claim 13, further comprising a selected sub-category indicator representing a selected sub-category of information content, the sub-category having a topical association with the selected category.

18. The interactive information display of claim 13, wherein one of the plurality of selectable information segment indicators is selected.

19. A method of displaying navigation links to destination information, comprising:
   in a single display:
      displaying a plurality of links to destination information and arranged in a group, one of the plurality of links being in a state of being selected;
      displaying an indication of information content category;
      displaying one or more links to alternate plurality of links to destination information;
      displaying one or more links to connecting categories;
   wherein information content in the destination information is topically associated with the information content category;
   wherein information content in the alternate plurality of links to destination information is topically associated with the information content category;
   wherein information content in the connecting categories is topically associated with the selected link to destination information;
   wherein selection of any one of the displayed one or more links to connecting categories causes display of an indication of different information content category representing the connecting category of the connecting categories that corresponds to the selected one of the one or more links; and
   wherein each link of the plurality of links to destination information is arranged within the single display in a particular layout and organization order based on specific information content associated with each of the plurality of links to destination information.

20. The method of claim 19, further comprising displaying information content that is linked to by the one of the plurality of links that is in the state of being selected.

21. The method of claim 19, wherein selection of one of the one or more links to connecting categories causes the one or more links to alternate plurality of links to destination information to be replaced by one or more links to different alternate plurality of links to destination information, causes the plurality of links to destination information to be replaced by a plurality of links to different destination information, and causes the one or more links to connecting categories to be replaced by one or more links to different connecting categories.

22. The method of claim 19, wherein selection of one of the one or more links to alternate plurality of links to destination information causes the plurality of links to destination information to be replaced by a plurality of links to different destination information and causes the one or more links to connecting categories to be replaced by a one or more links to different connecting categories.

23. The method of claim 19, wherein selection of a different link of the plurality of links to destination information causes the one or more links to connecting categories to be replaced by one or more links to different connecting categories.

24. The method of claim 19, wherein selection of a different link of the plurality of links to destination information causes the one or more links to connecting categories to be replaced by one or more links to different connecting categories and causes the indication of information content category and the one or more links to alternate plurality of links to destination information to remain the same.

25. The method of claim 19, further comprising moving one or more of the plurality of links to destination information and the one or more alternate plurality of links to destination information across the screen, on the screen, on to the screen, off of the screen, or any combination thereof.

26. An interactive computer implemented display of information, comprising:
- a plurality of navigation links to information displayed in a singularly viewable display, the plurality of navigation links comprising:
  - a plurality of navigation links to information destinations containing information;
  - one or more navigation links to alternate plurality of navigation links to information destinations containing information;
  - a category indicator identifying a category genus with which the information contained in the information destinations and the one or more alternate plurality of navigation links to information destinations containing information are topically associated; and
  - one or more selectable links to connecting categories, wherein each connecting category comprises an alternate category genus having a topical association with a selected navigation link to an information destination;
- wherein selection of any one of the one or more selectable links to connecting categories causes display of a category indicator representing the alternate category genus that corresponds to the selected any one of the one or more selectable links; and
- wherein each link of the plurality of links to information destinations is arranged within the display in a particular layout and organization order based on specific information content associated with each of the plurality of links to information destinations.

* * * * *